(12) United States Patent
Wang

(10) Patent No.: US 10,613,384 B2
(45) Date of Patent: Apr. 7, 2020

(54) ATTACHING APPARATUS AND ATTACHING METHOD

(71) Applicants: BOE TECHNOLOGY GROUP CO., LTD., Beijing (CN); HEFEI BOE DISPLAY LIGHTING CO., LTD., Anhui (CN)

(72) Inventor: Gang Wang, Beijing (CN)

(73) Assignees: BOE TECHNOLOGY GROUP CO., LTD., Beijing (CN); HEFEI BOE DISPLAY LIGHTING CO., LTD., Hefei, Anhui (CN)

( * ) Notice: Subject to any disclaimer, the term of this patent is extended or adjusted under 35 U.S.C. 154(b) by 40 days.

(21) Appl. No.: 15/966,348

(22) Filed: Apr. 30, 2018

(65) Prior Publication Data

US 2019/0064594 A1 Feb. 28, 2019

(30) Foreign Application Priority Data

Aug. 30, 2017 (CN) .......................... 2017 2 1099542

(51) Int. Cl.
G02F 1/1335 (2006.01)
F16M 11/08 (2006.01)
E05D 5/12 (2006.01)
G02F 1/13 (2006.01)

(52) U.S. Cl.
CPC ....... *G02F 1/133608* (2013.01); *E05D 5/128* (2013.01); *F16M 11/08* (2013.01); *G02F 1/1303* (2013.01)

(58) Field of Classification Search
CPC . G02F 1/133608; G02F 1/1303; F16M 11/08; E05D 5/128
USPC ................................ 349/153–154, 187, 189
See application file for complete search history.

(56) References Cited

U.S. PATENT DOCUMENTS

2018/0178502 A1* 6/2018 Yamada .................. B32B 38/18

\* cited by examiner

*Primary Examiner* — Charles S Chang
(74) *Attorney, Agent, or Firm* — Brooks Kushman P.C.

(57) ABSTRACT

An attaching apparatus is provided and includes: a base and a cover pivotally connected to the base. The base includes a to-be-attached object positioning portion for positioning and fixing the to-be-attached object. The cover includes an adhesive positioning portion for positioning and fixing the adhesive. The cover is rotatable relative to the base between an opening position and a closing position where the adhesive in the adhesive positioning portion is pressed against the to-be-attached object in the to-be-attached object positioning portion.

19 Claims, 3 Drawing Sheets

US 10,613,384 B2

ATTACHING APPARATUS AND ATTACHING METHOD

CROSS-REFERENCE TO RELATED APPLICATION

This application claims priority to Chinese Patent Application No. 201721099542.4 filed on Aug. 30, 2017, which is incorporated herein by reference in its entirety.

TECHNICAL FIELD

The present disclosure relates to the field of display manufacturing technology, and in particular to an attaching apparatus and an attaching method.

BACKGROUND

In the process of assembling display devices, a frame sealant is attached to a backlight source and then the backlight source with the frame sealant is adhered to other components. The frame sealant is usually manually attached, for example, the frame sealant is aligned with a to-be-attached product according to human eyes, and then the frame sealant is pressed to the product by sliding tweezers across the frame sealant. However, the above manner not only consumes a lot of manpower, but also cannot guarantee that each piece of frame sealant is attached to the same position. The frame sealant may be misplaced and thus it is difficult to ensure attachment accuracy. Further, when the frame sealant is pressed by the tweezers, the tweezers may slide to a light-emitting area, thereby resulting in defective products.

SUMMARY

An attaching apparatus is provided and includes a base and a cover pivotally connected to the base. The base includes a to-be-attached object positioning portion configured to position and fix the to-be-attached object; the cover includes an adhesive positioning portion configured to position and fix the adhesive. The cover is configured to rotate relative to the base between an opening position and a closing position where the adhesive in the adhesive positioning portion is pressed against the to-be-attached object in the to-be-attached object positioning portion.

Optionally, the adhesive positioning portion includes an adsorption plate configured to fix the adhesive by means of adsorption, and a positioning frame around an outer periphery of the adsorption plate and configured to position the adhesive. The adsorption plate is configured to move back and forth relative to the positioning frame in a direction perpendicular to an adsorption surface of the adsorption plate, thereby enabling the positioning frame to protrude from the adsorption plate to position the adhesive when the cover is at the opening position, and enabling the adsorption plate to push the adhesive out of the positioning frame and press the adhesive to the to-be-attached object when the cover is at the closing position.

Optionally, the positioning frame includes at least two positioning bars that are perpendicular to each other and are configured to position one corner of the adhesive.

Optionally, the cover further includes: an annular protruding prismoid at a periphery of the adsorption surface of the adsorption plate.

Optionally, the cover further includes a driving mechanism configured to drive the adsorption plate to move; and the driving mechanism includes a driving cylinder configured to drive the adsorption plate to move, and a guiding member configured to guide a movement direction of the adsorption plate.

Optionally, the guiding member includes a linear bearing mounted to the adsorption plate and a positioning pin that engages with the linear bearing.

Optionally, the base further includes an adsorption control switch configured to control on or off of an adsorption function of the adsorption plate. The adsorption control switch is at such a position that the cover contacts the adsorption control switch when the cover is at the closing position, thereby enabling the cover to trigger the adsorption control switch when the cover is at the closing position and then controlling the adsorption plate to turn off the adsorption function.

Optionally, the base further includes supporting poles configured to support the cover; and the supporting poles are configured to move up and down in a direction perpendicular to a fixing surface of the to-be-attached object positioning portion.

Optionally, the cover includes a first magnetic member, and the base includes a second magnetic member. The second magnetic member is disposed at such a position that when the cover is at the closing position, the second magnetic member attracts and fixes the first magnetic member, thereby fixing the cover.

Optionally, at least one of the first magnetic member and the second magnetic member is an electromagnet.

Optionally, the attaching apparatus further includes a control switch that serves as both of a control switch for the electromagnet and a movement control switch for the adsorption plate.

Optionally, the base further includes a position adjustment mechanism configured to adjust a position of the to-be-attached object positioning portion.

Optionally, the position adjustment mechanism includes a micrometer.

Optionally, the base further includes an installation plate with a supporting platform configured to support the cover when the cover is at the opening position.

Optionally, the supporting platform has an inclined supporting surface, and the inclined supporting surface is inclined with respect to a top surface of the base.

Optionally, an angle between the inclined supporting surface and the top surface of the base is equal to an angle between the cover at the opening position and the top surface of the base.

An attaching method is provided and includes: rotating the cover to the opening position, fixing a release film of the frame sealant to the adhesive positioning portion and fixing the to-be-attached object to the to-be-attached object positioning portion; and rotating the cover towards the base until the cover reaches the closing position where the adhesive in the adhesive positioning portion is pressed against the to-be-attached object in the to-be-attached object positioning portion.

Optionally, the adhesive positioning portion includes: an adsorption plate configured to fix the adhesive by means of adsorption and a positioning frame around an outer periphery of the adsorption plate and configured to position the adhesive. The base further includes an adsorption control switch configured to control on or off of an adsorption function of the adsorption plate. The cover further includes a driving mechanism configured to drive the adsorption plate to move; and the driving mechanism includes a driving cylinder configured to drive the adsorption plate to move, and a guiding member configured to guide a movement direction of the adsorption plate. The fixing a release film of the frame sealant to the adhesive positioning portion, includes: placing the release film of the frame sealant into the positioning frame, and fixing the release film of the frame sealant to the adhesive positioning portion by the adsorption plate by means of adsorption. The rotating the cover towards the base until the cover reaches the closing position where the adhesive in the adhesive positioning portion is pressed against the to-be-attached object in the to-be-attached object positioning portion, includes: pressing, by the cover when the cover is rotated to the closing position, the adsorption control switch and a movement control switch for the adsorption plate, thereby enabling the adsorption plate to turn off the adsorption function and enabling the driving cylinder to push the adsorption plate to move downward under guidance of the guiding member until a protruding prismoid on the adsorption plate presses tightly an effective region of a sealant body of the frame sealant to the to-be-attached object in the to-be-attached object positioning portion.

Optionally, the attaching method further includes: releasing the movement control switch for the adsorption plate, thereby enabling the driving cylinder to drive the adsorption plate to move upwardly to return back.

Figure 1:
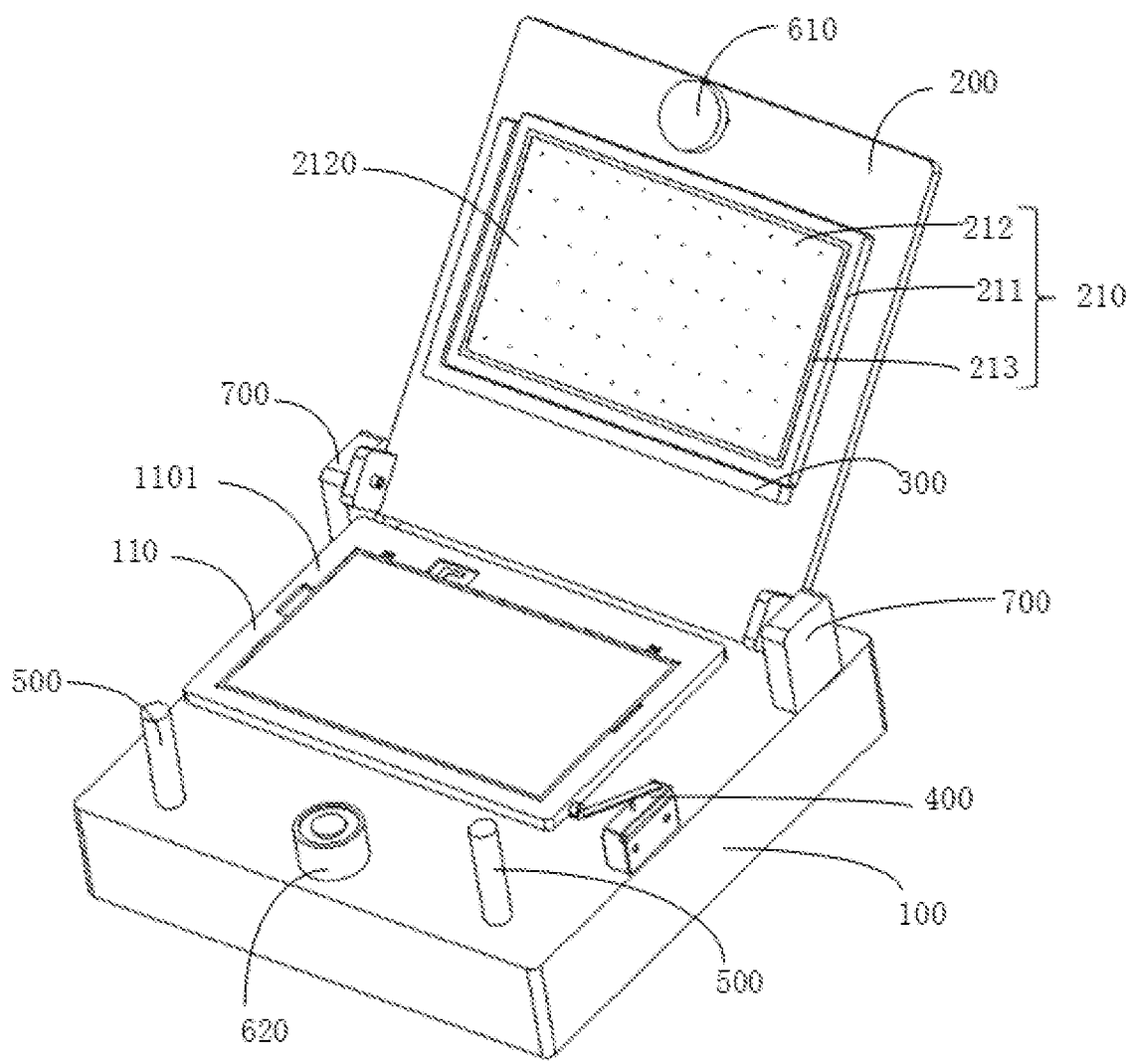
FIG. 1 is a schematic view of an attaching apparatus in an opening state according to an embodiment of the present disclosure.

The above drawings have shown embodiments of the present disclosure which will be described in details in the following. The drawings and description are not intended to limit the scope of conception of the present disclosure in any way, but serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of devices and methods consistent with aspects related to the disclosure as recited in the appended claims.

In order to solve the problems of low attachment efficiency, poor attachment accuracy and defective products caused by manually attaching frame sealants to backlight sources in the related art, the present disclosure provides an attaching apparatus which can improve attachment efficiency and attachment accuracy.

As shown in FIG. 1 to FIG. 5, one embodiment of the present disclosure provides an attaching apparatus which is used to attach adhesive to a to-be-attached object. The attaching apparatus includes a base 100 and a cover 200. The cover 200 is pivotally connected to the base 100.

Specifically, the base 100 is provided with a to-be-attached object positioning portion 110. The to-be-attached object positioning portion 110 is used to position and fix the to-be-attached object. The cover 200 is provided with an adhesive positioning portion 210. The adhesive positioning portion 210 is used to position and fix the adhesive.

The cover 200 may be hinged to the base 100, thereby enabling the cover 200 to rotate relative to the base 100 between an opening position and a closing position. When the cover 200 is at the closing position, the adhesive placed in the adhesive positioning portion 210 is pressed against the to-be-attached object placed in the to-be-attached object positioning portion 110, thereby pressing the adhesive to the to-be-attached object.

In the above embodiment, the to-be-attached object positioning portion 110 of the base 100 of the attaching apparatus may be used to position and fix the to-be-attached object such as a display substrate. The adhesive positioning portion 210 of the cover 200 may be used to position and fix the adhesive such as a frame sealant. In the attachment process, the cover 200 may be rotated to the opening position, so that the adhesive is fixed to the cover 200 and the to-be-attached object is fixed to the base 100; then, the cover 200 may be rotated to the closing position where the cover 200 is stacked on the base 100, so that the adhesive at the cover 200 may be pressed to the to-be-attached object. Comparing with the manual attachment mode in the related art, the attaching apparatus of one embodiment of the present disclosure can improve attachment efficiency, ensure attachment accuracy, and avoid defective products caused by manual attachment.

It should be noted that, the attaching apparatus of one embodiment of the present disclosure can be used to attach a variety of adhesives to the to-be-attached object. The attaching apparatus of one embodiment of the present disclosure will be described in details hereinafter with an example in which the to-be-attached object is a backlight source and the adhesive is a frame sealant.

Figure 2:
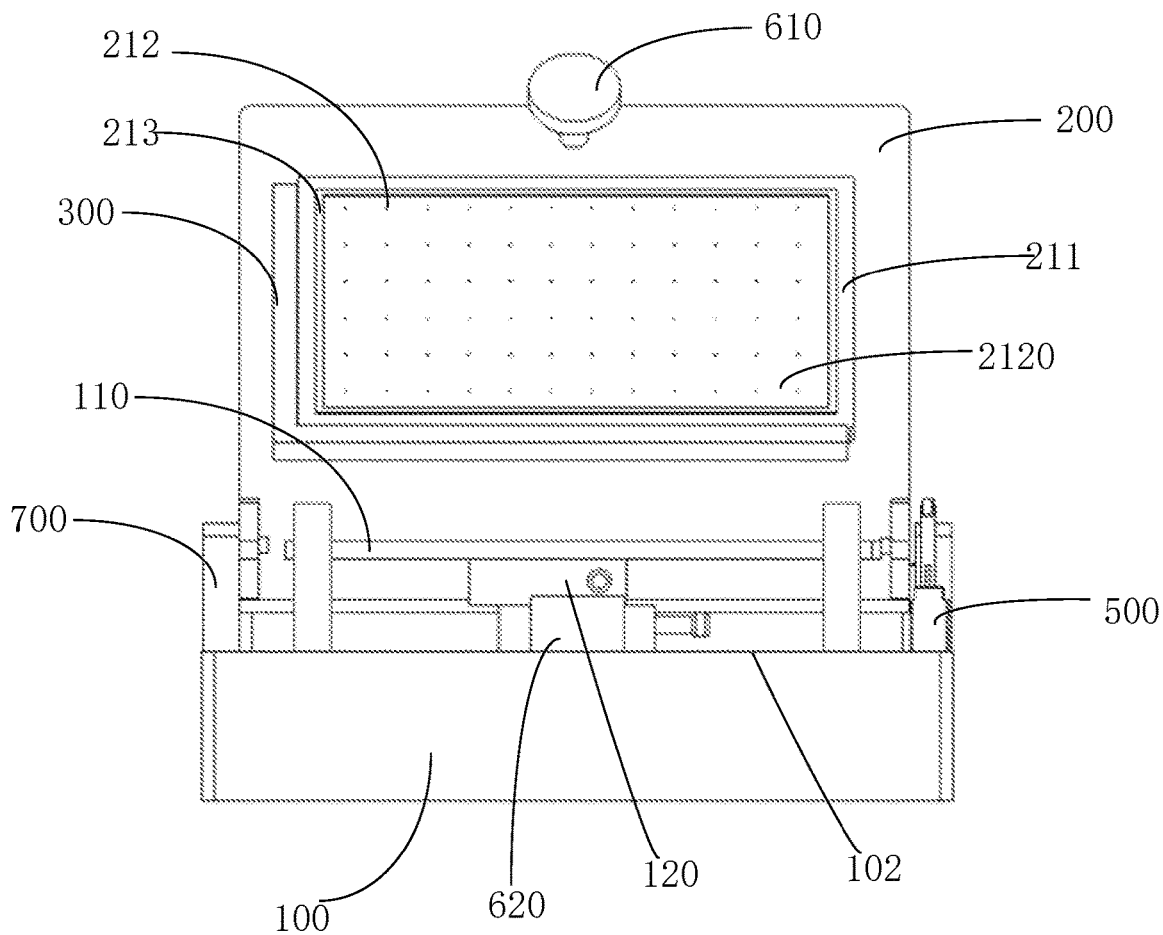
FIG. 2 is a front view of the attaching apparatus in the opening state according to an embodiment of the present disclosure.
Figure 4:
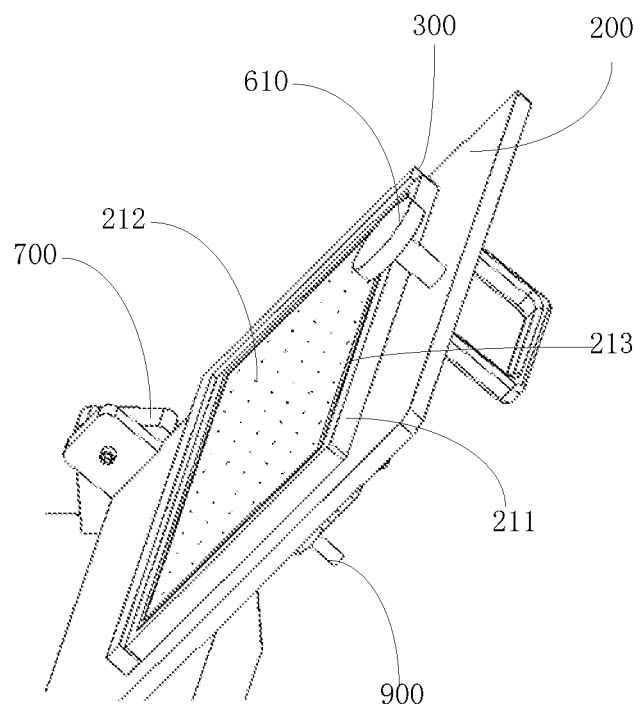
FIG. 4 is a schematic view of a cover in an opening position of the attaching apparatus according to an embodiment of the present disclosure.

In one embodiment of the present disclosure, as shown in FIG. 1, FIG. 2 and FIG. 4, the adhesive positioning portion 210 includes an adsorption plate 211 and a positioning frame. The adsorption plate 211 is used to fix the adhesive by means of adsorption. The positioning frame is disposed around an outer periphery of the adsorption plate 211, and is used to position the adhesive. In one embodiment shown in FIG. 1, the positioning frame includes at least two positioning bars 300. The at least two positioning bars 300 are perpendicular to each other, and are used to position one corner of the adhesive.

In the above embodiment, the adhesive positioning portion 210 of the cover 200 employs the adsorption plate 211, and the adsorption plate 211 may be a plate with a plurality of small air holes 212. Under negative pressure, the adsorption plate 211 can absorb the adhesive. For the frame sealant, the frame sealant includes a frame-shaped sealant body and a release film attached to the sealant body. The adsorption plate 211 may absorb the release film, thereby fixing the frame sealant. The positioning frame is disposed around an outer periphery of the adsorption plate 211, and includes at least two positioning bars 300 which are perpendicular to each other. When positioning the frame sealant, one corner of the frame sealant may be aligned with the two positioning bars 300, respectively, and then the frame sealant may be fixed by the adsorption plate 211 by means of adsorption, thereby realizing positioning and fixing of the frame sealant.

Optionally, the two positioning bars 300 may be arranged in "L" shape, thereby positioning one corner of the to-be-attached object. Of course, in other embodiments, the two positioning bars 300 may be arranged in other shapes.

It should be noted that in other embodiments, the adhesive positioning portion 210 may be implemented in other form, which is not specially limited.

In one embodiment of the present disclosure, optionally, as shown in FIG. 1 and FIG. 4, the adsorption plate 211 is capable of moving back and forth relative to the positioning frame in a direction perpendicular to an adsorption surface 2210 of the adsorption plate 211. When the cover 200 is at the opening position, the positioning frame protrudes from the adsorption plate 211, thereby positioning the adhesive. When the cover 200 is at the closing position, the adsorption plate 211 pushes the absorbed adhesive out of the positioning frame and presses the absorbed adhesive to the to-be-attached object.

In the above embodiment, the adsorption plate 211 is capable of moving relative to the positioning frame at the cover 200. For example, in the embodiment shown in FIG. 2, the adsorption plate 211 is capable of moving back and forth relative to the positioning frame in a direction (i. e., a direction perpendicular to a page where FIG. 2 is) perpendicular to the adsorption surface 2210 of the adsorption plate 211. In this way, in the attachment process, when the cover 200 is rotated to the opening position and the frame sealant is positioned in the cover 200, the adsorption surface 2210 of the adsorption plate 211 is slightly lower than the positioning frame, and then the positioning frame protrudes above the adsorption surface 2210, thereby enabling the positioning frame to position the frame sealant. When the cover 200 is rotated to the closing position where the cover 200 is stacked on the base 100, the frame sealant at the adsorption plate 211 aligns with the to-be-attached object at the base 100, is substantially parallel to the to-be-attached object at the base 100 and is in a slight contact with the to-be-attached object at the base 100. At this point, the adsorption plate 211 is driven to move in a direction towards the base 100, and then presses the frame sealant, thereby pushing the frame sealant out of the positioning frame, i.e., enabling the frame sealant to protrude out of the positioning bars 300 and be pressed tightly against the to-be-attached object. As a result, the frame sealant is attached to the to-be-attached object.

In addition, in one embodiment of the present disclosure, optionally, when the adhesive is the frame sealant which includes a frame-shaped sealant body and a release film, as shown in FIG. 1, FIG. 2 and FIG. 4, an annular protruding prismoid 213 is provided at a periphery of the adsorption surface 2210 of the adsorption plate 211. The protruding prismoid 213 is of a frame structure corresponding to positions of the sealant body of the frame sealant.

In the above embodiment, by the presence of the protruding prismoid 213, when the adsorption plate 211 presses downwardly the frame sealant, the protruding prismoid 213 can press tightly an effective region of the sealant body of the frame sealant to the to-be-attached object.

Figure 5:
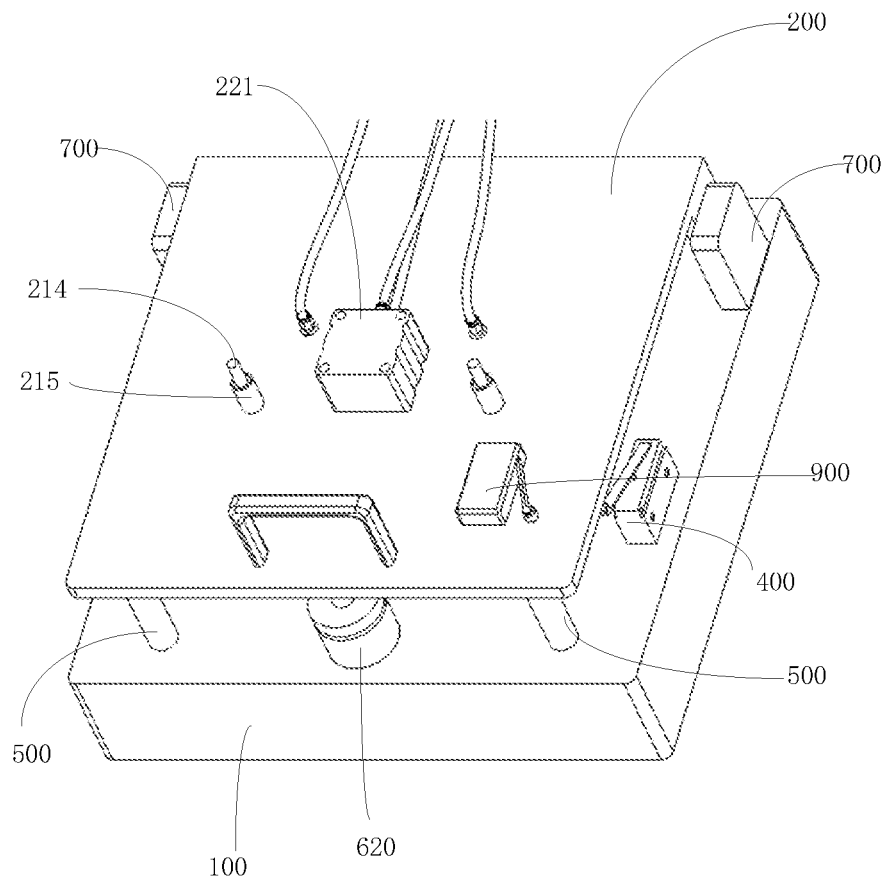
FIG. 5 is a schematic view of the attaching apparatus in a closing state according to an embodiment of the present disclosure.

In addition, in one embodiment of the present disclosure, optionally, as shown in FIG. 5, the cover 200 is further provided with a driving mechanism for driving the adsorption plate 211 to move. The driving mechanism includes a driving cylinder 221 and a guiding member. The driving cylinder 221 is used to drive the adsorption plate 211 to move. The guiding member is used to guide a movement direction of the adsorption plate 211.

In the above embodiment, the adsorption plate 211 is driven by the driving cylinder 221 to move, and the presence of the guiding member can guide the movement direction of the adsorption plate 211. Optionally, the guiding member includes a linear bearing 215 mounted to the adsorption plate 211 and a positioning pin 214 that engages with the linear bearing 215.

It should be noted that the above embodiments just provide an exemplary example of the driving mechanism of the adsorption plate 211; in actual application, the driving mechanism of the adsorption plate 211 may be implemented in other forms.

In addition, in one embodiment of the present disclosure, optionally, as shown in FIG. 1, FIG. 2 and FIG. 5, an adsorption control switch 400 is provided at the base 100 and is used to control on or off of an adsorption function of the adsorption plate 211. The adsorption control switch 400 is disposed at such a position that the cover 200 can contact the adsorption control switch 400 when the cover 200 is at the closing position, thereby enabling the cover 200 to trigger the adsorption control switch 400 when the cover 200 is at the closing position, and then controlling the adsorption plate 211 to turn off the adsorption function.

In the above embodiment, the adsorption control switch 400, which is provided at the base 100 for controlling on or off of the adsorption function of the adsorption plate 211, is a normally open-normally closed switch. When the cover 200 is stacked on the base 100, the frame sealant on the adsorption plate 211 aligns with the to-be-attached object, is parallel to and in a slight contact with the to-be-attached object. Meanwhile, the cover 200 may contact the adsorption control switch 400 to trigger the adsorption control switch 400, thus, the negative pressure from the adsorption plate 211 disappears and then the frame sealant is capable of being separated from the adsorption plate 211. At this point, the adsorption plate 211 is driven by the driving cylinder 221 to move in a direction towards the base 100, thereby pushing the frame sealant out of the positioning frame and then pressing the frame sealant on the to-be-attached object.

In the above embodiment, since the adsorption control switch 400 for the adsorption plate 211 is disposed on the base 100 and can be directly triggered by the cover 200 at the closing position to control working state of the adsorption plate 211, thereby achieving automatic control. Of course, in actual application, the adsorption control switch 400 may be disposed at other position and then may be manually controlled.

In addition, in one embodiment of the present disclosure, optionally, as shown in FIG. 1, FIG. 2 and FIG. 5, supporting poles 500 may be further provided on the base 100 for supporting the cover 200. The supporting poles 500 are capable of moving up and down in a direction perpendicular to a fixing surface 1101 of the to-be-attached object positioning portion 110.

In the above embodiment, the supporting poles 500 on the base 100 can adjust their heights relative to the fixing surface 1101 of the to-be-attached object positioning portion 110, so that the supporting poles 500 can support the cover 200 and keep the cover 200 to be horizontally arranged, thereby ensuring that the frame sealant and the to-be-attached object are horizontally arranged.

In addition, in one embodiment of the present disclosure, optionally, as shown in FIG. 1 and FIG. 5, a first magnetic member 610 is provided on the cover 200, and a second magnetic member 620 is provided on the base 100. The second magnetic member 620 is disposed at a position corresponding to the first magnetic member 610, so that when the cover 200 is at the closing position, the second magnetic member 620 attracts and fixes the first magnetic member 610, thereby fixing the cover 200.

In the above embodiment, by the presence of the first magnetic member 610 on the cover 200 and the presence of the second magnetic member 620 on the base 100, when the cover 200 is at the closing position where the cover 200 is stacked on the base 100, a magnetic force is generated between the second magnetic member 620 and the first magnetic member 610, thereby keeping the cover 200 stable when the driving cylinder 221 drives the adsorption plate 211 to move towards the base 100.

Optionally, the first magnetic member 610 may be an iron block, and the second magnetic member 620 may be an electromagnet. The magnetic force of the electromagnet is controlled by on and off of electrical current. The attaching apparatus further includes a control switch for controlling on and off of electrical current supplied for the electromagnet.

It should be noted, in actual application, the first magnetic member 610 may be an electromagnet, and the second magnetic member 620 may be an iron block; or, both of the first magnetic member 610 and the second magnetic member 620 are electromagnets.

In addition, in one embodiment of the present disclosure, optionally, as shown in FIG. 5, the control switch for the electromagnet and a movement control switch for the adsorption plate 211 may be an identical switch such as an integrated switch 900.

In the above embodiment, the control switch for the electromagnet and the movement control switch (i.e., a control switch for the driving cylinder 221) for the adsorption plate 211 are integrated to from the integrated switch 900, and then, when the cover 200 is stacked on the base 100, the integrated switch 900 is pressed down to power the electromagnet so that the cover 200 is fixed to the base 100 by means of magnetic force while enabling the adsorption plate 211 to move in a direction towards the base 100, thereby pressing the frame sealant to the to-be-attached object.

In addition, in one embodiment of the present disclosure, optionally, as shown in FIG. 2, a position adjustment mechanism 120 is further provided on the base 100. The position adjustment mechanism 120 is used to adjust positions of the to-be-attached object positioning portion 110.

Optionally, the position adjustment mechanism 120 may employ a micrometer that can adjust the positions of the to-be-attached object positioning portion 110 along X-Y directions in a plane parallel to a top surface 102 (as shown in FIG. 2) of the base 100. The precision of the micrometer may reach 0.01 mm, thereby ensuring that the to-be-attached object on the base 100 accurately aligns with the frame sealant.

Figure 3:
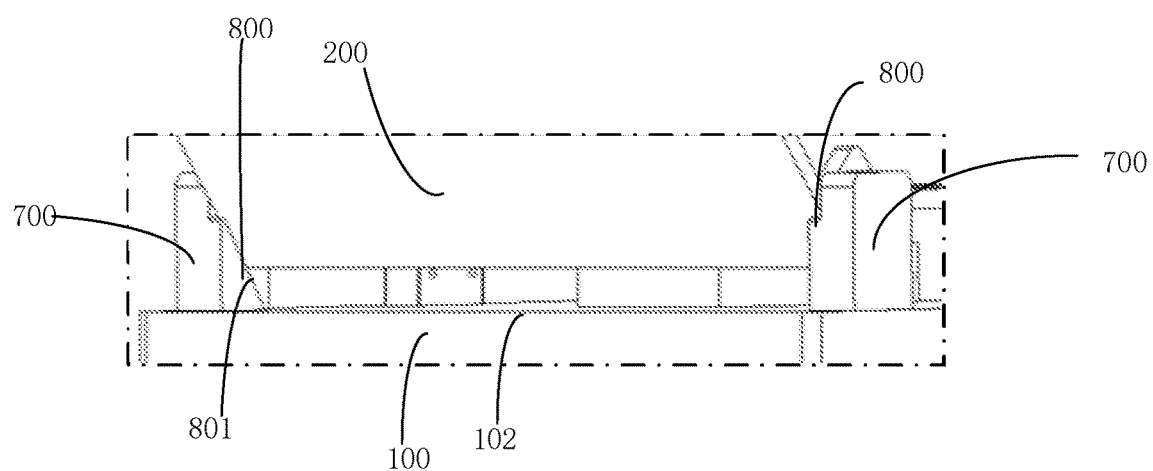
FIG. 3 is a partial rear view of the attaching apparatus in the opening state according to an embodiment of the present disclosure.

In addition, in one embodiment of the present disclosure, optionally, as shown in FIG. 1 and FIG. 3, an installation plate 700 is disposed in the base 100 and the cover 200 is hinged to the installation plate 700. A supporting platform 800 is disposed on the installation plate 700. When the cover 200 is at the opening position, the supporting platform 800 supports the cover 200, thereby keeping the cover 200 at a position where a preset opening angel is defined between the cover 200 and the base 100 and then facilitating operation. In one embodiment as shown in FIG. 3, the supporting platform 800 has an inclined supporting surface 801. The inclined supporting surface 801 is inclined with respect to the top surface 102 of the base 100. An angle between the inclined supporting surface 801 and the top surface 102 of the base 100 may be set according to actual conditions. For example, the angle between the inclined supporting surface 801 and the top surface 102 of the base 100 may be set according to an angle between the cover 200 at the opening position and the top surface 102 of the base 100. In one embodiment, the angle between the inclined supporting surface 801 and the top surface 102 of the base 100 is equal to the angle between the cover 200 at the opening position and the top surface 102 of the base 100.

The working process of the attaching apparatus of one embodiment of the present disclosure is described hereinafter.

As shown in FIG. 1, the cover 200 is first rotated to the opening position, the frame sealant is placed on the adsorption plate 211 with the release film of the frame sealant aligning with the L-shaped positioning bars 300. Then, the frame sealant is fixed to the adsorption plate 211 by means of adsorption. Meanwhile, the to-be-attached object is placed within the to-be-attached object positioning portion 110 of the base 100.

As shown in FIG. 5, the cover 200 is rotated towards the base 100, thereby enabling the frame sealant to align with the to-be-attached object in the base 100. When the cover 200 is rotated to the supporting poles 500 and presses the supporting poles 500, the frame sealant is substantially parallel to the to-be-attached object and in slight contact with the to-be-attached object. Meanwhile, the cover 200 presses the adsorption control switch 400 for the adsorption plate 211, and then the negative pressure from the adsorption plate 211 disappears accordingly. As this time, the frame sealant is capable of being separated from the adsorption plate 211. Subsequently, the control switch for the electromagnet and the movement control switch for the adsorption plate 211 are pressed, so that the driving cylinder 221 pushes the adsorption plate 211 to move downwardly until the protruding prismoid 213 on the adsorption plate 211 presses tightly an effective region of the sealant body of the frame sealant. Meanwhile, a magnetic force is generated by the electromagnet, thereby keeping the cover 200 horizontal without turning over.

When the control switch for the electromagnet and the movement control switch for the adsorption plate 211 are released, the driving cylinder 221 drives the adsorption plate 211 to move upwardly to return back. Meanwhile, the magnetic force generated by the electromagnet also disappears, and then the cover 200 is opened to the opening position. At this time, the adsorption control switch 400 for the adsorption plate 211 may be turned on again to generate negative pressure, thereby attaching another piece of frame sealant.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. An attaching apparatus for attaching adhesive to a to-be-attached object, comprising:
   a base; and
   a cover pivotally connected to the base;
   wherein the base includes a to-be-attached object positioning portion configured to position and fix the to-beattached object; and the cover includes an adhesive positioning portion configured to position and fix the adhesive; and wherein the cover is rotatable relative to the base between an opening position and a closing position where the adhesive in the adhesive positioning portion is pressed on the to-be-attached object in the to-be-attached object positioning portion.

2. The attaching apparatus of claim 1, wherein the adhesive positioning portion includes:

an adsorption plate configured to fix the adhesive by means of adsorption; and a positioning frame around an outer periphery of the adsorption plate and configured to position the adhesive;

wherein the adsorption plate is movable back and forth relative to the positioning frame in a direction perpendicular to an adsorption surface of the adsorption plate, thereby enabling the positioning frame to protrude from the adsorption plate to position the adhesive when the cover is at the opening position, and enabling the adsorption plate to push the adhesive out of the positioning frame and to press the adhesive on the to-be-attached object when the cover is at the closing position.

3. The attaching apparatus of claim 2, wherein the positioning frame includes at least two positioning bars that are perpendicular to each other and are configured to position one corner of the adhesive.

4. The attaching apparatus of claim 2, wherein the cover further includes: an annular protruding prismoid at a periphery of the adsorption surface of the adsorption plate.

5. The attaching apparatus of claim 2, wherein the cover further includes a driving mechanism; and the driving mechanism includes a driving cylinder configured to drive the adsorption plate to move, and a guiding member configured to guide a movement direction of the adsorption plate.

6. The attaching apparatus of claim 5, wherein the guiding member includes a linear bearing on the adsorption plate and a positioning pin that engages with the linear bearing.

7. The attaching apparatus of claim 2, wherein the base further includes an adsorption control switch that controls on or off of an adsorption function of the adsorption plate;

wherein the adsorption control switch is at such a position that the cover contacts the adsorption control switch when the cover is at the closing position, thereby enabling the cover to trigger the adsorption control switch when the cover is at the closing position and then controlling the adsorption plate to turn off the adsorption function.

8. The attaching apparatus of claim 1, wherein the base further includes supporting poles configured to support the cover; and the supporting poles are movable up and down in a direction perpendicular to a fixing surface of the to-be-attached object positioning portion.

9. The attaching apparatus of claim 1, wherein the cover includes a first magnetic member, and the base includes a second magnetic member; and wherein the second magnetic member is at such a position that when the cover is at the closing position, the second magnetic member attracts and fixes the first magnetic member, thereby fixing the cover.

10. The attaching apparatus of claim 9, wherein at least one of the first magnetic member and the second magnetic member is an electromagnet.

11. The attaching apparatus of claim 10, further comprising a control switch that serves as both of a control switch for the electromagnet and a movement control switch for the adsorption plate.

12. The attaching apparatus of claim 1, wherein the base further includes a position adjustment mechanism configured to adjust a position of the to-be-attached object positioning portion.

13. The attaching apparatus of claim 12, wherein the position adjustment mechanism includes a micrometer.

14. The attaching apparatus of claim 1, wherein the base further includes an installation plate with a supporting platform configured to support the cover when the cover is at the opening position.

15. The attaching apparatus of claim 14, wherein the supporting platform has an inclined supporting surface, and the inclined supporting surface is inclined with respect to a top surface of the base.

16. The attaching apparatus of claim 15, wherein an angle between the inclined supporting surface and the top surface of the base is equal to an angle between the cover at the opening position and the top surface of the base.

17. An attaching method for attaching adhesive to a to-be-attached object with the attaching apparatus of claim 1, the method comprises:

rotating the cover to the opening position, fixing a release film of the frame sealant to the adhesive positioning portion and fixing the to-be-attached object to the to-be-attached object positioning portion; and rotating the cover towards the base until the cover reaches the closing position where the adhesive in the adhesive positioning portion is pressed on the to-be-attached object in the to-be-attached object positioning portion.

18. The attaching method of claim 17, wherein the adhesive positioning portion includes: an adsorption plate configured to fix the adhesive by means of adsorption and a positioning frame around an outer periphery of the adsorption plate and configured to position the adhesive;

the base further includes an adsorption control switch that controls on or off of an adsorption function of the adsorption plate;

the cover further includes a driving mechanism; and the driving mechanism includes a driving cylinder configured to drive the adsorption plate to move, and a guiding member configured to guide a movement direction of the adsorption plate;

the fixing a release film of the frame sealant to the adhesive positioning portion, includes: placing the release film of the frame sealant into the positioning frame, and fixing the release film of the frame sealant to the adhesive positioning portion by the adsorption plate by means of adsorption;

the rotating the cover towards the base until the cover reaches the closing position where the adhesive in the adhesive positioning portion is pressed on the to-be-attached object in the to-be-attached object positioning portion, includes:

pressing, by the cover when the cover is rotated to the closing position, the adsorption control switch and a movement control switch for the adsorption plate, thereby enabling the adsorption plate to turn off the adsorption function and enabling the driving cylinder to push the adsorption plate to move downward under guidance of the guiding member until a protruding prismoid on the adsorption plate presses an effective region of a sealant body of the frame sealant to the to-be-attached object in the to-be-attached object positioning portion.

19. The attaching method of claim 17, further comprising:
releasing the movement control switch for the adsorption plate, thereby enabling the driving cylinder to drive the adsorption plate to move upwardly to return back.

* * * * *